(12) United States Patent
Michelon et al.

(10) Patent No.: US 11,859,866 B2
(45) Date of Patent: Jan. 2, 2024

(54) ELECTRIC HEATER

(71) Applicant: I.R.C.A. S.P.A. INDUSTRIA RESISTENZE CORAZZATE E AFFINI, Vittorio Veneto (IT)

(72) Inventors: Lucio Michelon, Tarzo (IT); Christian Ceotta, Miane (IT); Antonio De Moliner, Oderzo (IT); Christian Bortoluzzi, Godega di Sant'Urbano (IT); Federico Zoppas, Treviso (IT)

(73) Assignee: I.R.C.A. S.P.A. INDUSTRIA RESISTENZE CORAZZATE E AFFINI, Vittorio Veneto (IT)

( * ) Notice: Subject to any disclaimer, the term of this patent is extended or adjusted under 35 U.S.C. 154(b) by 615 days.

(21) Appl. No.: 17/044,895

(22) PCT Filed: Apr. 3, 2019

(86) PCT No.: PCT/IB2019/052715
§ 371 (c)(1),
(2) Date: Oct. 2, 2020

(87) PCT Pub. No.: WO2019/193508
PCT Pub. Date: Oct. 10, 2019

(65) Prior Publication Data
US 2021/0148604 A1    May 20, 2021

(30) Foreign Application Priority Data
Apr. 3, 2018   (IT) .................. 102018000004169

(51) Int. Cl.
A47J 31/54   (2006.01)
F24H 1/14    (2022.01)
(Continued)

(52) U.S. Cl.
CPC ............ *F24H 1/142* (2013.01); *A47J 31/542* (2013.01); *F24H 9/139* (2022.01); *F24H 9/1818* (2013.01);
(Continued)

(58) Field of Classification Search
None
See application file for complete search history.

(56) References Cited

U.S. PATENT DOCUMENTS 3,617,699 A * 11/1971 Othmer .................... F16L 53/34
                                                        219/535
5,724,478 A *  3/1998 Thweatt ................... F24H 1/142
                                                        219/535
(Continued)

FOREIGN PATENT DOCUMENTS

DE    102011007542 A1 * 10/2012 ............ A47J 31/542
EP       3694295 A1 *  8/2020
WO   WO-2019215602 A1 * 11/2019 ............ F24H 1/142

*Primary Examiner* — Joseph M. Pelham
(74) *Attorney, Agent, or Firm* — AMSTER, ROTHSTEIN & EBENSTEIN LLP

(57) ABSTRACT

An electric heater including a metal body, in which a first pipe and a second pipe are provided in the metal body. The first pipe and second pipe are mutually distinct so as to be crossed by two distinct flows of fluid to be heated. A first heating stretch, a second heating stretch and a third heating stretch are arranged in the metal body. The first pipe and the second pipe are arranged between the first heating stretch and the second heating stretch. The third heating stretch is proximal to the second pipe and distal from the first pipe. The second pipe is arranged between the first pipe and the third heating stretch.

16 Claims, 3 Drawing Sheets

(51) Int. Cl.
*F24H 9/18* (2022.01)
*H05B 3/06* (2006.01)
*H05B 3/48* (2006.01)
*F24H 9/1818* (2022.01)
*F24H 9/13* (2022.01)

(52) U.S. Cl.
CPC ............... *H05B 3/06* (2013.01); *H05B 3/48* (2013.01); *H05B 2203/021* (2013.01)

(56) References Cited

U.S. PATENT DOCUMENTS

| | | | |
|---|---|---|---|
| 2011/0280554 A1* | 11/2011 | Schlipf | H05B 3/48 53/473 |
| 2014/0209703 A1* | 7/2014 | Jerdee | B26D 3/00 239/304 |
| 2017/0241665 A1* | 8/2017 | Wedam | F24H 1/142 |

* cited by examiner

ELECTRIC HEATER

CROSS REFERENCE TO RELATED APPLICATION

This application claims benefit under 35 U.S.C. § 371 to international application No. PCT/IB2019/052715 filed on Apr. 3, 2019, which claims priority to Italian application No. 102018000004169 filed Apr. 3, 2018, the contents of which are incorporated by reference in their entireties.

FIELD OF THE INVENTION

The present invention relates to an electric heater, in particular of the flow through heater (FTH) type for machines for preparing hot beverages.

BACKGROUND ART

Electric heaters are often used for heating a fluid, e.g. water, which runs in a tube.

A particularly advantageous type of electric heaters are known as "flow through heaters" or FTH.

FTHs are formed by a metal body in which a tube is inserted, in which the fluid to be heated can run, and one or two resistors, which heat the tube and therefore the fluid flowing therein.

FTHs are often used in machines for preparing hot beverages, such as coffee.

Machines for preparing hot beverages are continuously evolving and many can also deliver steam. The steam delivery function is useful for preparing beverages, such as cappuccino.

A limitation of the current machines for preparing hot beverages is in that two separate electric heaters, each with its own resistor and tube, are needed to heat two different streams of fluid simultaneously. Each electric heater is destined only for heating the respective flow of fluid. In particular, each electric heater is destined only for the production of hot water or only for the generation of steam. However, this solution implies both excessive overall dimensions and high costs, aspects which are particularly relevant because the goal of producers is to be able to obtain compact machines at a contained cost.

Alternatively, the heating of two different streams of fluid can be obtained only in sequential manner, i.e. the two fluid streams are not heated simultaneously. Indeed, a single tube in which the fluid to be heated runs is provided.

In particular, the delivery of hot water and the generation of steam cannot occur simultaneously. As a function of the power delivered by the resistor, the heating leads to the production of hot water or steam.

SUMMARY OF THE INVENTION

It is an object of the present invention to provide an electric heater, in particular of the flow through heater type, which allows greater heat management opportunities than the prior art.

It is another object of the present invention to provide an electric heater, in particular of the flow through heater type, which allows the simultaneous heating of two different fluid flows.

In particular, it is an object of the present invention to provide such an electric heater which allows the simultaneous delivery of both hot water and steam.

It is another object of the present invention to improve heating energy efficiency.

At least one of such objects, and other objects which will become apparent in light of the present description, is achieved by means of an electric heater either comprising or consisting of:
a metal body;
a first pipe and a second pipe provided in the metal body; the first pipe and the second pipe being mutually distinct so as to be crossed by two different flows of fluid to be heated;
a first heating stretch and a second heating stretch of at least one electric resistor and a third heating stretch of a further electric resistor;
wherein the first heating stretch, the second heating stretch and the third heating stretch are arranged in the metal body;
wherein the first heating stretch and the second heating stretch are adapted to heat the first pipe and the second pipe by transferring heat through the metal body;
wherein the third heating stretch is proximal to the second pipe and distal from the first pipe;
wherein the second pipe is arranged between the first pipe and the third heating stretch; and preferably wherein the first pipe and the second pipe are arranged between the first heating stretch and the second heating stretch and/or wherein the first heating stretch and the second heating stretch are arranged on opposite sides with respect to a first plane (or surface) J on which the longitudinal axis of the first pipe and the longitudinal axis of the second pipe lie.

Preferably, a plane (or surface) K, on which the longitudinal axis of the first heating stretch and the longitudinal axis of the second heating stretch lie, is arranged between the longitudinal axis of the first pipe and the longitudinal axis of the second pipe.

The plane (or surface) J and the plane (or surface) K are preferably mutually transversal, e.g. orthogonal.

According to another aspect of present invention, a machine is provided for the preparation of hot beverages according to claim 15.

Advantageously, the arrangement of the first heating stretch and of the second heating stretch allows heating both the first pipe and the second pipe in optimum manner. Furthermore, advantageously, the arrangement of the third heating stretch with respect to the second pipe and to the first pipe allows the prevalent heating of the second pipe, i.e. the third heating stretch is adapted to transfer most of the heat to the second pipe with respect to the first pipe.

Therefore, advantageously, the particular arrangement of the three heating stretches and of the two pipes offers greater versatility in the management of the heating of the two pipes and greater energy efficiency.

Indeed, for example, both pipes can be heated by both the first heating stretch and the second heating stretch without needing to activate also the third heating stretch and, only when needed, the second pipe may be heated also by the third heating stretch, whilst the first pipe is not substantially heated (or in any case the first pipe is heated much less) by third heating stretch, so that a greater energy efficiency is achieved.

Furthermore, the second pipe can be heated only by the third heating stretch (the other two heating stretches not being active), whereby preventing the third heating stretch from also heating the first pipe (or in any case limiting the supply of heat to the first pipe) when it is not necessary, so that a greater energy efficiency is achieved.

Advantageously, the electric heater according to the invention allows the simultaneously heating of two separate flows of fluid.

In particular, the electric heater allows the simultaneous delivery of both hot water and steam. The hot water and the steam can escape from two different outlet openings.

Furthermore, the electric heater occupies little space and can be manufactured at low cost.

According to an aspect, the arrangement of the heating stretch, or of the heating stretches, and of the two pipes allows the heating of the two flows of fluid which run in the tubes in optimum manner.

Preferably, there are only two pipes, i.e. only the first pipe and the second pipe.

Furthermore, preferably, there are only three heating stretches.

Preferably, the first pipe and the second pipe have circular section.

Preferably, the first pipe has an inner diameter either smaller or equal to the inner diameter of the second pipe.

In particular, when the electric heater comprises a first heating stretch and a second heating stretch of at least one electric heater, preferably the inner diameter of the first pipe is smaller than the inner diameter of the second pipe.

According to an aspect, the shape of the metal body allows optimizing the heat distribution, whereby limiting unwanted thermal losses.

According to an embodiment, a first heating stretch and a second heating stretch dedicated to heating both pipes are provided, and a third heating stretch is also provided dedicated to heating a single pipe, preferably the pipe intended for the production of hot water.

According to an aspect, the third heating stretch can be either activated or deactivated as a function of heating requirements.

According to an aspect, the metal body has an empty space, in particular an air gap, between the two pipes. This empty space allows limiting the transmission of heat, in particular increasing the thermal insulation between the two pipes.

Preferably, the first pipe and the second pipe define a respective longitudinal axis, which preferably is a central longitudinal axis of the respective pipe.

Preferably, the first heating stretch, the second heating stretch and the third heating stretch define a respective longitudinal axis, which preferably is a central longitudinal axis of the respective heating stretch.

Further features and advantages of the present invention will become more apparent in light of detailed description of preferred, but not exclusive embodiments. The dependent claims describe particular embodiments of the invention.

BRIEF DESCRIPTION OF THE FIGURES

The description of the invention refers to the accompanying drawings, which are provided by way of non-limiting example, in which.

The same elements, or elements having a similar function, are indicated by the same reference numerals.

DESCRIPTION OF EXAMPLE EMBODIMENTS OF THE INVENTION

Figure 1:
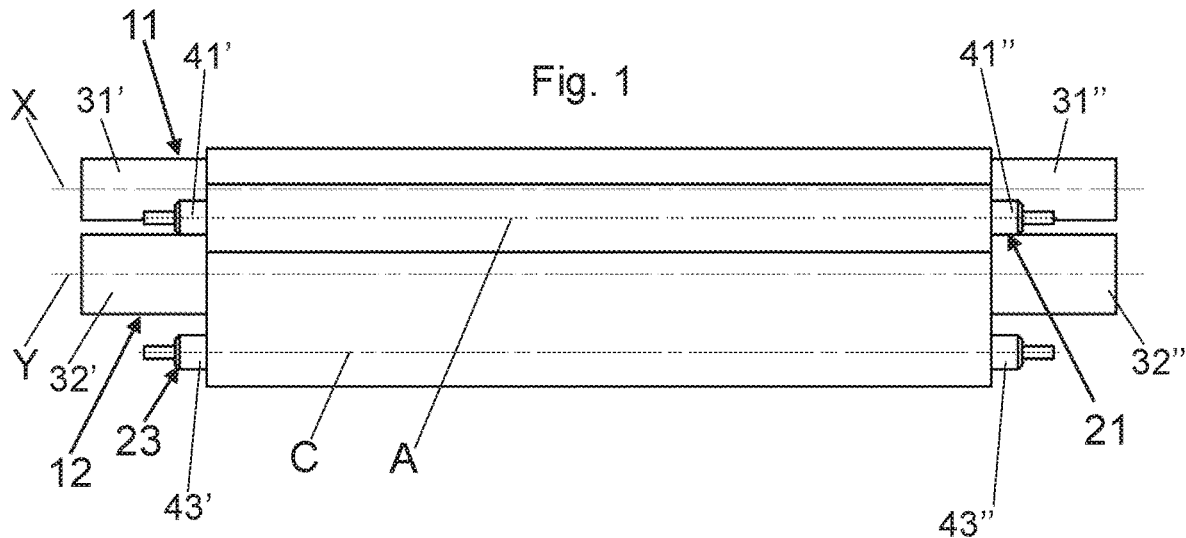
FIG. 1 shows a side view of an example of electric heater according to the present invention.
Figure 2:
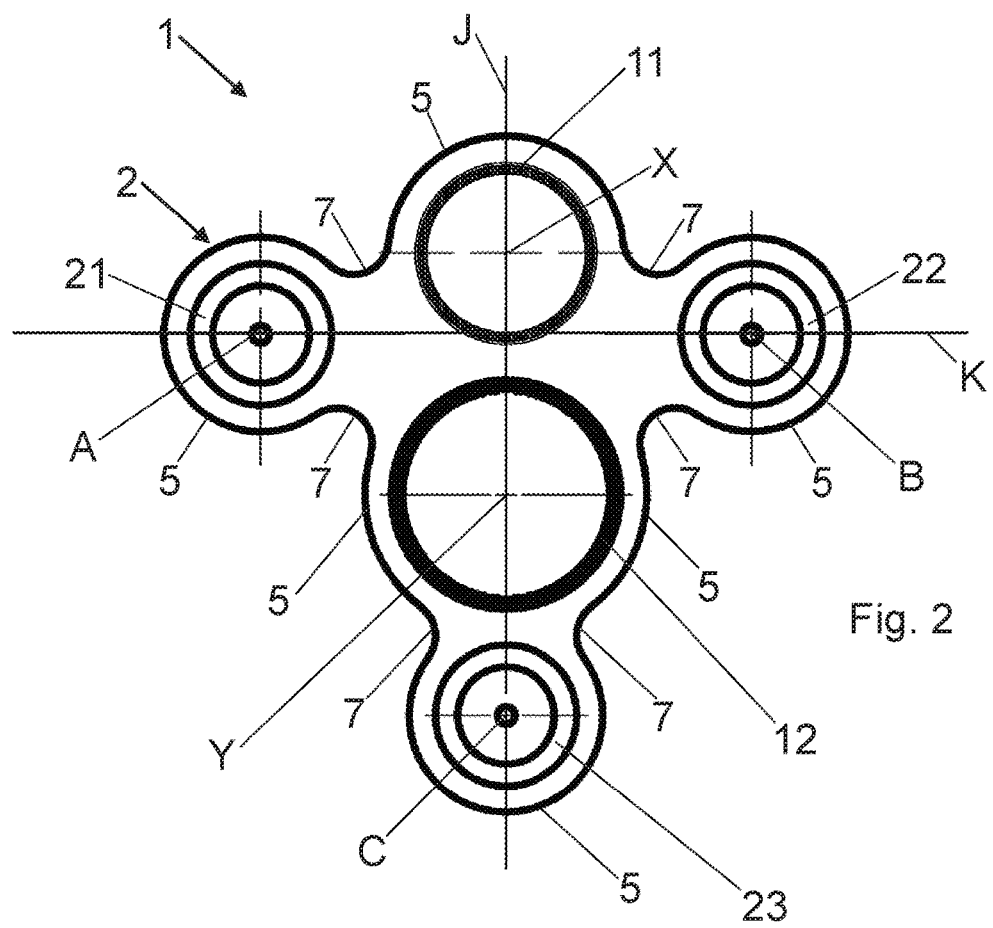
FIG. 2 shows a section view of the electric heater in FIG. 1.
Figure 3:
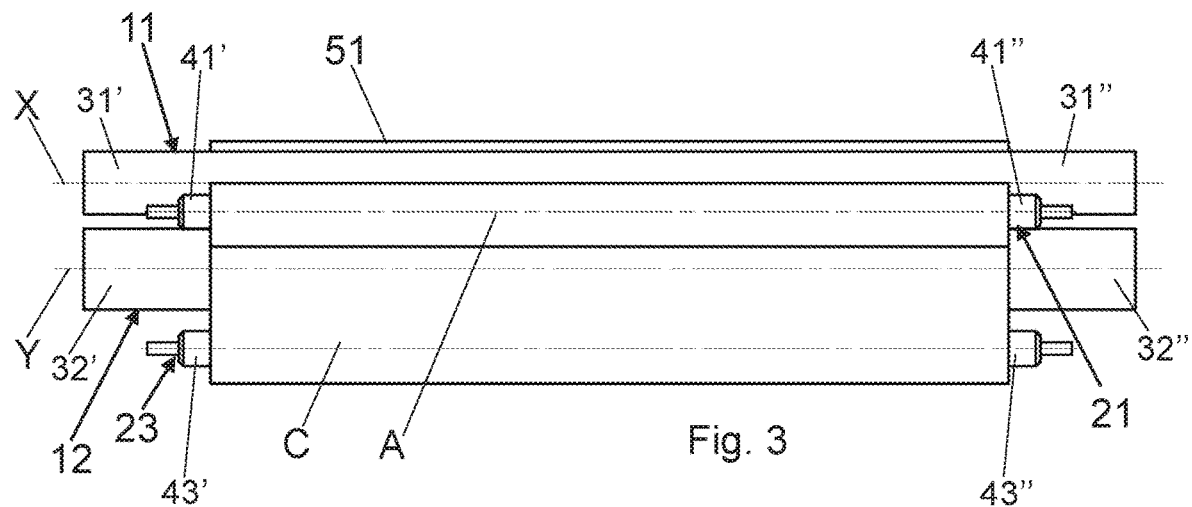
FIG. 3 shows a side view of another example of electric heater according to the present invention.

In general, an electric heater 1 according to the invention comprises:
- a metal body 2;
- a first pipe 11 and a second pipe 12 provided in the metal body 2;
- at least one heating stretch 21, 22 of at least one electric resistor, arranged in the metal body 2;

wherein the at least one heating stretch 21, 22 is adapted to heat the first pipe 11 and the second pipe 12 whereby transferring heat through the metal body 2;

and wherein the first pipe 11 and the second pipe 12 are mutually distinct so as to be crossed by two distinct flows of fluid to be heated.

In the figures, the first pipe 11 and the second pipe 12 are a first tube and a second tube, respectively.

FIGS. from 1 to 5 illustrate examples of embodiments of an electric heater 1, in particular of the flow through heater (FTH) type.

In the illustrated examples, the electric heater 1 comprises
- a metal body 2;
- two tubes 11, 12, also named first tube 11 and second tube 12, arranged in the metal body 2;
- three heating stretches 21, 22, 23 of at least one electric heater, also named first heating stretch 21, second heating stretch 22 and third heating stretch 23, arranged in the metal body 2.

Tube 11 and tube 12 are mutually distinct so as to apt to be crossed by two distinct flows of fluid to be heated. Preferably, tube 11 is destined to receive a flow of water to be heated in order to obtain steam; and pipe 12 is destined to receive another flow of water to be heated to obtain hot water. In this case, advantageously, steam is obtained at the outlet of tube 11 and hot water is obtained at the outlet of tube 12. Alternatively, tube 11 may be destined to receive a flow of water to be heated in order to obtain hot water and tube 12 may be destined to receive another flow of water to be heated in order to obtain steam.

Tube 11 and tube 12 are preferably not in mutual communication.

Preferably, the inner diameter of tube 11 is smaller than or equal to the inner diameter of tube 12. For example, the ratio between the inner diameter of tube 11 and the inner diameter of tube 12 can be comprised between 0.3 and 1, e.g. between 0.3 and 0.9 or between 0.3 and 0.7.

Preferably, the tubes 11, 12 are made of metal, e.g. steel, in particular stainless steel.

Tube 11 defines a longitudinal axis X and tube 12 defines a longitudinal axis Y. Longitudinal axis X and longitudinal axis Y are preferably also the central axes of the respective tube 11, 12.

Tube 11 and tube 12 are preferably parallel or substantially parallel to each other. In particular, longitudinal axis X and longitudinal axis Y are preferably parallel or substantially parallel to each other.

Tubes 11, 12, and in particular their longitudinal axes X, Y, can be rectilinear or substantially rectilinear, or can comprise one or more curved portions. For example, the tubes 11, 12 can be substantially helix-shaped, or only one curved portion can be provided, for example.

Heating stretch 21 and heating stretch 22 are adapted to heat both tube 11 and tube 12 by transferring heat by conduction through the metal body 2.

Preferably, heating stretch 21 and heating stretch 22 are identical or substantially identical to each other.

Heating stretch 21 and heating stretch 22 can be part of the same electric resistor or each heating stretch 21, 22 can be part of a respective electric resistor.

In other words, a single electric resistor, preferably sheathed, comprising the heating stretch 21 and the heating stretch 22 can be provided, or two distinct electric resistors can be provided, preferably armored, of which one electric resistor comprises the heating stretch 21 and the other electric resistor comprises the heating stretch 22.

Figure 7:
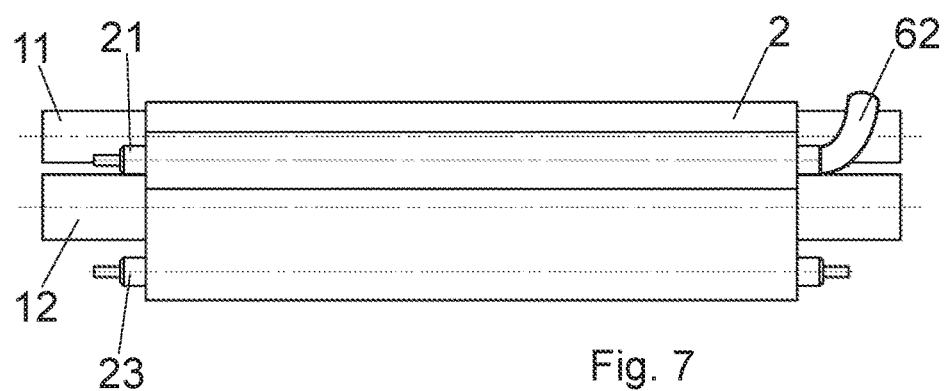
FIG. 7 shows a side view of another variant example of an electric heater according to the present invention.

When a single electric resistor which comprises both heating stretches 21, 22 is provided, such electric resistor is, for example, bent so as to comprise at least one curved stretch 62 (shown partially in FIG. 7), e.g. an elbow, which joins the two heating stretches 21, 22.

Heating stretch 21 and heating stretch 22 are preferably parallel or substantially parallel to each other and preferably also parallel or substantially parallel to tube 11 and tube 12.

Preferably, the heating stretch 21 and the second heating stretch 22 are arranged on opposite sides with respect to a first plane or surface J on which the longitudinal axis X of tube 11 and the longitudinal axis Y of tube 12 lie.

Preferably, the heating stretch 21 and the heating stretch 22 are arranged symmetrically with respect to such plane or surface J.

Preferably, the heating stretches 21, 22 and the two tubes 11, 12 are arranged so that a plane or surface K, on which the longitudinal axis A of heating stretch 21 and the longitudinal axis B of heating stretch 22 lie, is arranged between the longitudinal axis X of tube 11 and the longitudinal axis Y of second tube 12. Plane J and plane K are mutually transversal. Preferably, plane J and plane K are mutually orthogonal. Preferably, tube 11 and tube 12 are arranged between heating stretch 21 and heating stretch 22, e.g. only partially or at least partially arranged between heating stretch 21 and heating stretch 22. By way of non-limiting example only, only a lower portion of tube 11 and only an upper portion of tube 12 can be between the first heating stretch 21 and the third heating stretch 23. Preferably, the third heating stretch 23, tube 12 and tube 11 are arranged in sequence, in particular directly in sequence, being separated only by the metal body 2.

Preferably, the distance, in particular the minimum distance, between the first heating stretch 21 and tube 11 is comprised between 2 and 8 mm; and/or the distance, in particular the minimum distance, between the first heating stretch 21 and tube 12 is comprised between 2 and 8 mm; and/or the distance, in particular the minimum distance, between the second heating stretch 22 and tube 11 is comprised between 2 and 8 mm; and/or the distance, in particular the minimum distance, between the second heating stretch 22 and tube 12 is comprised between 2 and 8 mm.

Preferably, the distance, in particular the minimum distance, between the first heating stretch 21 and tube 11 is substantially equal to the distance, in particular to the minimum distance, between the second heating stretch 22 and tube 11.

Preferably, the distance, in particular the minimum distance, between the first heating stretch 21 and tube 12 is substantially equal to the distance, in particular to the minimum distance, between the second heating stretch 22 and tube 12.

Optionally, plane K is proximal to longitudinal axis X and distal from longitudinal axis Y, meaning that the minimum distance between plane K and longitudinal axis X is less than the minimum distance between plane K and longitudinal axis Y.

More in general, optionally, heating stretch 21 and heating stretch 22 can be proximal with respect to tube 11 and distal with respect to tube 12. In other words, optionally, the minimum distance between heating stretch 21 and tube 11 can be less than the minimum distance between heating stretch 21 and tube 12, and similarly for heating stretch 22.

The third heating stretch 23 is inserted in the metal body 2, and preferably is proximal to tube 12 and distal from tube 11. In this manner, the heating stretch 23 is adapted to heat the second tube 12 by transferring heat by conduction through the metal body 2.

In particular, the heating stretch 23 is adapted to heat prevalently the second tube 12, i.e. is adapted to transfer most heat to tube 12 with respect to tube 11.

Preferably, the distance, in particular the minimum distance, between the third heating stretch 23 and pipe 12 is comprised between 1 and 5 mm.

Preferably, the distance, in particular the minimum distance, between tube 11 and tube 12 is comprised between 1 and 5 mm.

Furthermore, preferably, the distance, in particular the minimum distance, between the third heating stretch 23 and tube 11 is at least equal to the sum of: outer diameter of the tube 12, minimum distance between the third heating stretch 23 and tube 12 (preferably comprised between 1 and 5 mm), minimum distance between tube 11 and tube 12 (preferably comprised between 1 and 5 mm).

Preferably, the heating stretch 23 is parallel or substantially parallel to tube 12 and preferably also to tube 11 and to heating stretches 21, 22. In particular, longitudinal axis C is parallel or substantially parallel to longitudinal axis Y and preferably also to longitudinal axes A, B and X.

Preferably, the third heating stretch 23 is distanced from the plane K on which the longitudinal axes A, B of the first heating stretch 21 and the second heating stretch 22 lie.

Optionally, heating stretch 21, heating stretch 22 and heating stretch 23 are arranged at about 120° from one another with respect to the second pipe 12. In particular, longitudinal axes A, B and C are arranged at 120° with respect to longitudinal axis Y.

Preferably, tube 12 is arranged between tube 11 and the third heating stretch 23.

Preferably, the longitudinal axis C of the heating stretch 23 is coplanar to the longitudinal axis X of tube 11 and to the longitudinal axis Y of tube 12.

The heating stretch 23 is distinct from heating stretch 21 and from heating stretch 22. In particular, the heating stretch 23 can be activated independently with respect to heating stretches 21, 22.

More in detail, a further electric resistor which comprises heating stretch 23 is provided when an electric resistor comprising heating stretch 21 and the second heating stretch 22 is provided. Such further electric resistor is different from the electric resistor which comprises heating stretch 21 and heating stretch 22.

When a first electric resistor comprising heating stretch 21 and a second electric resistor is provided, distinct from the first electric resistor, comprising the heating stretch 22, a further electric resistor is provided which comprises heating stretch 23 and which is different from the first electric resistor and from the second electric resistor.

As anticipated, the two tubes 11, 12 and the heating stretches 21, 22, 23 are inserted in the metal body 2.

The metal body 2 is preferably made of aluminum or aluminum alloy.

The metal body 2 comprises five housings, preferably only five housings, in each of which one among tube 11, tube 12, heating stretch 21, heating stretch 22 and heating stretch 23 is inserted.

In particular, the metal body 2 comprises inner walls which delimit each housing and which adhere to tubes 11, 12 and to heating stretches 21, 22, 23, respectively.

Preferably, such housings are substantially holes in the metal body 2. Preferably, the inner walls of the metal body 2 which delimit such holes completely surround the respective part of the tube 11, 12 and the respective part of heating stretch 21, 22, 23 inserted in the metal body 2.

Figure 4:
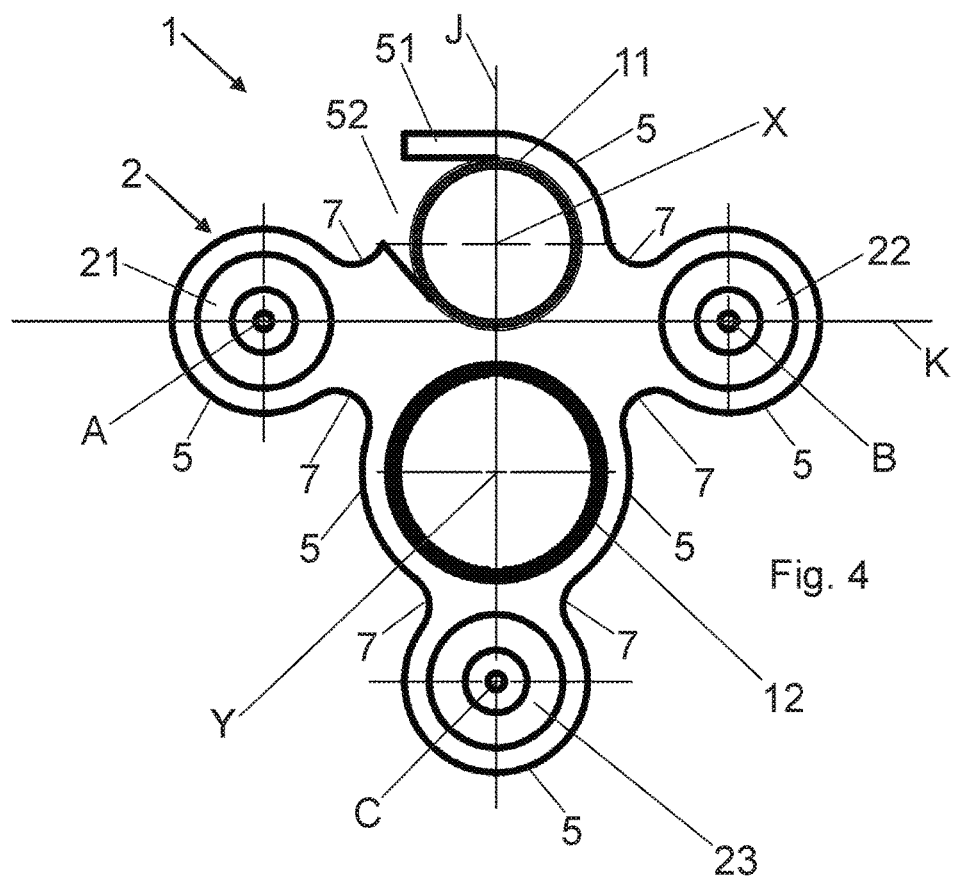
FIG. 4 shows a section view of the electric heater in FIG. 3.

Alternatively, instead of a longitudinal hole, a housing provided with a longitudinal opening 52 for the tube 11 can be provided (FIG. 4). In particular, such housing is provided with a wing 51, which can be partially folded about the tube 11. In this case, a longitudinal portion of the tube 11 arranged in the metal body 2 is uncovered, i.e. not surrounded by the metal body 2. The folding of the wing 51 occurs in the step of assembling of the tube 11 in the metal body 2.

The tubes 11, 12 are fixed to the metal body 2. Preferably, the tubes 11, 12 are brazed to the metal body 2.

Preferably, tube 11 comprises two ends 31', 31", or end portions, which protrude from the metal body 2. The portion of tube 11 which is inserted, in particular arranged, in the metal body 2 extends between the ends 31', 31".

Similarly, pipe 12 preferably comprises two ends 32', 32", or end portions, which protrude from the metal body 2. The portion of tube 12 which is inserted, in particular arranged, in the metal body 2 extends between the ends 32', 32".

Preferably, the heating stretch 21 comprises two ends 41', 41" which protrude from the metal body 2. The portion of heating stretch 21 which is inserted, in particular arranged, in the metal body 2 extends between the ends 41', 41".

Similarly, the heating stretch 22 preferably comprises two ends (not shown in the figures), which protrude from the metal body 2. The portion of heating stretch 22 which is inserted, in particular arranged, in the metal body 2 extends between such ends.

Similarly, the heating stretch 23 preferably comprises two ends 43', 43", which protrude from the metal body 2. The portion of heating stretch 23 which is inserted, in particular arranged, in the metal body 2 extends between the ends 43', 43". One or more than one of said ends of the tubes 11, 12 and heating stretches 21, 22, 23 can comprise a curved segment, even when the respective portion of tube 11, 12 or heating stretch 21, 22, 23, inserted, in particular arranged, in the metal body 2 is rectilinear.

The heating stretches 21, 22, 23 may be assembled in the metal body 2 according to procedures known to a person skilled in the art dealing with flow through heaters. For example, the heating stretches 21, 22, 23 may be made by inserting at least one resistive wire into the respective hole of the metal body 2. The holes are then filled with insulating material, e.g. in form of powder. The holes are then closed by means of insulating elements crossed by a respective conductor pin, in electric contact with the resistive wire.

Alternatively, it is possible, for example, to insert a respective electric resistor pre-assembled into a respective hole of the metal body 2. The metal body 2 and the resistors are then fixed to one another, e.g. by brazing.

Preferably, the metal body 2 has an outer profile or contour which partially follows the outer profile or contour of the tubes 11, 12 and/or of the heating stretches 21, 22, 23.

For example, when the tubes 11, 12 and the heating stretches 21, 22, 23 have a circular outer profile, the outer profile of the metal body 2 comprises curved, preferably partially circular, portions 5. Such curved portions 5 are convex towards the outside, and therefore are also named convex portions 5 for description purposes.

Each convex portion 5 is preferably parallel to a respective portion of tube 11, 12 or heating stretch 21, 22, 23.

Preferably, the wall thickness of each convex portion 5 is comprised from 0.5 to 3 mm.

Preferably, the convex portions 5 are interconnected by a respective curved portion, which is preferably a concave portion 7 towards the outside.

Figure 5:
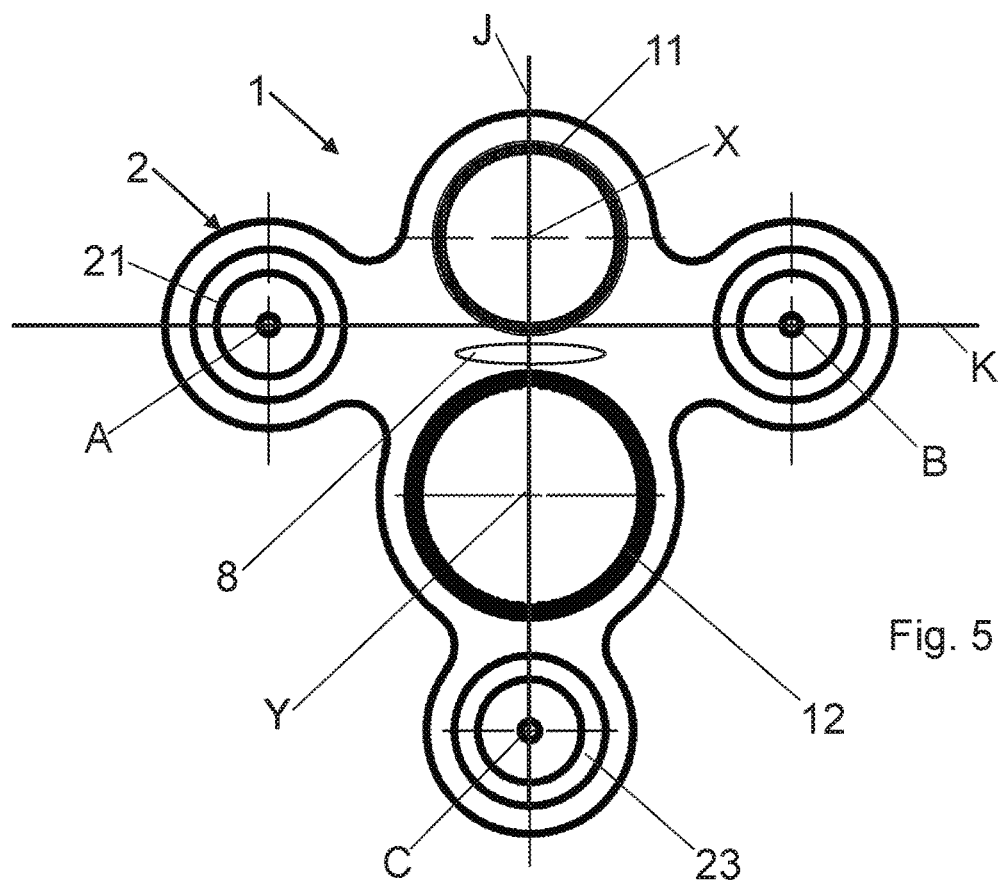
FIG. 5 shows a section view of a variant example of an electric heater according to the present invention.

Preferably, in all embodiments, the metal body 2 has at least one empty space, e.g. an empty space 8 (shown in FIG. 5) between tube 11 and tube 12. In this case, preferably, the third heating stretch 23, the tube 12, the empty space 8 and the tube 11 are arranged in sequence, in particular directly in sequence, being separated only by the metal body 2.

The empty space 8 can be a through hole or a cavity having, for example, a side wall, an bottom wall adjacent, e.g. orthogonal, to the side wall and an opening opposite to the bottom wall. Another opening can be provided alternatively to the bottom wall.

The cross section of the empty space 8, in particular of the wall of the metal body 2 which delimits it, is preferably shaped as an ellipse. Preferably, the major axis of such ellipse is parallel to the plane K. The empty space may also have a different shape from elliptical.

Preferably, the empty space 8 extends longitudinally, and preferably along all or most of the longitudinal extension of the tube 11 and the tube 12.

In all the embodiments described above, the presence of the third heating stretch 23 is optional. The description of the variants which do not comprise the heating stretch 23 is substantially provided by the present description, not considering the references to the third heating stretch.

Figure 6:
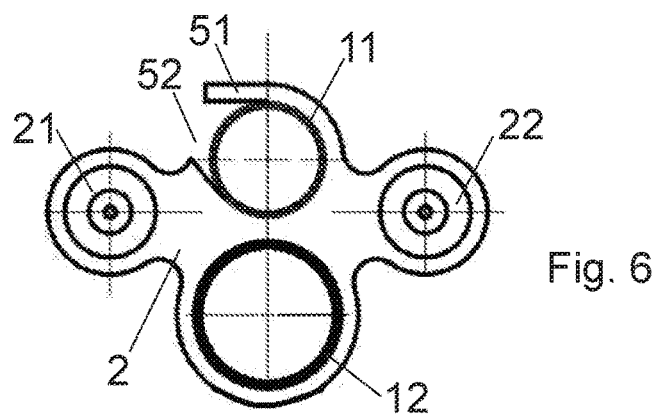
FIG. 6 shows a side view of another variant example of an electric heater according to the present invention.

A non-limiting example of electric resistor which is not provided with the third heating stretch 23 is illustrated in FIG. 6.

Furthermore, it is worth noting that also only one heating stretch may be provided.

In this case, only heating stretch 21 or only heating stretch 22 can be provided.

In a further variant, heating stretch 23 and only either heating stretch 21 or heating stretch 22 may be provided.

In all embodiments described above, alternatively to the pipes inserted in the metal body 2, the first pipe 11 and the second pipe 12 can be defined by a first through hole and a second through hole both made in the metal body 2, respectively. In other words, the same metal body 2 delimits the two pipes for the two distinct fluid flows. Preferably, the first hole has a smaller diameter than the diameter of the second hole.

All other technical characteristics described in the variant comprising the two tubes may be present in the variant with the two through holes which define the pipes.

According to an aspect, the invention comprises a machine for preparing hot beverages comprising an electric heater as described above.

Optionally, the machine is configured so that the flow rate of fluid fed to the first pipe or tube 11 is lower than the flow rate of the fluid fed to the second pipe or tube 12. By way of non-limiting example only, the machine can comprise two pumps, of which a first pump is connected to the first tube 11 and a second pump is connected to a second tube 12. The first pump is adapted to send a flow rate of fluid lower than the flow rate of the fluid of the second pump.

Preferably, the two pumps draw water from the same water tank.

By way of non-limiting example only, an advantageous method of operation of a machine for preparing hot beverages as described above, comprises the steps of:

a) heating a first flow of fluid, in particular water, which passes through the first pipe or tube 11 by means of the at least one heating stretch 21, 22, e.g. by means of the first heating stretch 21 and the second heating stretch 22, to deliver the first flow of fluid, preferably aqueous vapor;

b) heating a second flow of fluid, in particular water, distinct from the first flow of fluid, which passes through the second pipe or tube 12 by means of the at least one heating stretch 21, 22, e.g. by the first heating stretch 21 and the second heating stretch 22, for supplying the second fluid flow, preferably heated water in liquid state.

Step a) and step b) can be performed either simultaneously or in sequence. For example, it is possible to perform step a) first and then step (b), or vice versa. It is also possible to start step a), and to start b) before the end of step a), or vice versa. It is apparent that, according to requirements, only step a) or step b) can be performed.

In a particular example of such method, when the heating stretch 23 is provided, the latter can be activated or deactivated independently from the at least one heating stretch 21, 22.

The invention claimed is:

1. An electric heater comprising:
a metal body;
a first pipe and a second pipe provided in the metal body, the first pipe and the second pipe being mutually distinct so as to be apt to be crossed by two distinct flows of fluid to be heated;
a first heating stretch and a second heating stretch of at least one electric resistor and a third heating stretch of a further electric resistor;
wherein the first heating stretch, the second heating stretch and the third heating stretch are arranged in the metal body;
wherein the first heating stretch and the second heating stretch are adapted to heat the first pipe and the second pipe by transferring heat through the metal body;
wherein the first pipe and the second pipe are arranged between the first heating stretch and the second heating stretch;
wherein the third heating stretch is proximal to the second pipe and distal from the first pipe; and
wherein the second pipe is arranged between the first pipe and the third heating stretch.

2. The electric heater according to claim 1, wherein the first heating stretch and the second heating stretch are arranged on opposite sides with respect to a plane J on which a longitudinal axis X of the first pipe and a longitudinal axis Y of the second pipe lie.

3. The electric heater according to claim 1, wherein a plane K, on which a longitudinal axis A of the first heating stretch and a longitudinal axis B of the second heating stretch lie, is arranged between a longitudinal axis X of the first pipe and a longitudinal axis Y of the second pipe.

4. The electric heater according to claim 2, wherein a plane K, on which a longitudinal axis A of the first heating stretch and a longitudinal axis B of the second heating stretch lie, is arranged between a longitudinal axis X of the first pipe and a longitudinal axis Y of the second pipe;
wherein the plane J and the plane K are mutually transversal.

5. The electric heater according to claim 1, wherein said third heating stretch is parallel to the second pipe.

6. The electric heater according to claim 1, wherein a longitudinal axis C of the third heating stretch is coplanar to a longitudinal axis X of the first pipe and to a longitudinal axis Y of the second pipe.

7. The electric heater according to claim 1, wherein said at least one electric resistor is a single electric resistor comprising the first heating stretch and the second heating stretch.

8. The electric heater according to claim 1, wherein the first pipe and the second pipe are mutually parallel; and
wherein the first heating stretch and the second heating stretch in are parallel to the first pipe and to the second pipe.

9. The electric heater according to claim 1, wherein the first pipe has an inner diameter smaller than an inner diameter of the second pipe.

10. The electric heater according to claim 1, wherein the first pipe, the second pipe, the first heating stretch and the second heating stretch are rectilinear.

11. The electric heater according to claim 1, wherein the metal body has an empty space arranged between the first pipe and the second pipe.

12. The electric heater according to claim 1, wherein the metal body is provided with a longitudinal opening at the first pipe.

13. The electric heater according to claim 1, wherein the first pipe and the second pipe are respectively a first tube and a second tube inserted in the metal body;
or wherein the first pipe and the second pipe are respectively defined by a first through hole and by a second through hole of the metal body.

14. A machine for making hot beverages comprising the electric heater according to claim 1.

15. The electric heater according to claim 1, wherein said at least one electric resistor includes a first electric resistor including the first heating stretch; and a second electric resistor, distinct from the first electric resistor, including the second heating stretch.

16. The electric heater according to claim 1, wherein the further electric resistor of the third heating stretch is a third electic resistor distinct from the first and second resistors.

* * * * *